(12) United States Patent
Zenke

(10) Patent No.: US 6,327,516 B1
(45) Date of Patent: Dec. 4, 2001

(54) OPERATION TERMINAL AND REMOTE OPERATION SYSTEM FOR A ROBOT

(75) Inventor: Hideo Zenke, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/548,360

(22) Filed: Apr. 12, 2000

(30) Foreign Application Priority Data

Nov. 9, 1999 (JP) .................................................. 11-318178

(51) Int. Cl.[7] .................................................. G06F 19/00
(52) U.S. Cl. ........................... 700/245; 700/87; 700/181; 700/212; 700/247; 700/251; 700/253; 700/254; 700/255; 700/256; 700/257; 700/259; 700/264; 318/560; 318/567; 318/568.1; 318/568.13; 318/568.14; 318/568.15; 219/124.34; 219/125.12; 219/130.5; 701/23; 901/42
(58) Field of Search .................................. 700/245, 247, 700/251, 253, 255, 256, 259, 264, 87, 181, 212, 254, 257; 318/568.13–568.16, 568.11, 560, 567, 568.1; 219/124.34, 125.12, 137.71, 130.5; 901/42; 701/23

(56) References Cited

U.S. PATENT DOCUMENTS

| | | | |
|---|---|---|---|
| 4,906,814 | * | 3/1990 | Toyoda et al. ................... 219/121.34 |
| 4,920,248 | * | 4/1990 | Toyoda et al. ................... 219/121.34 |
| 5,331,264 | * | 7/1994 | Cheng et al. ..................... 318/568.11 |
| 5,914,876 | * | 6/1999 | Hirai ....................................... 700/87 |
| 6,002,104 | * | 12/1999 | Hsu ..................................... 219/130.5 |
| 6,011,241 | * | 1/2000 | Rongo .............................. 219/124.34 |
| 6,256,556 | * | 7/2001 | Zenken ................................. 700/245 |

FOREIGN PATENT DOCUMENTS

| | | | |
|---|---|---|---|
| 10058365 | * | 3/1998 | (JP) . |
| 11282518 | * | 10/1999 | (JP) . |
| 10-29181 | | 2/1998 | (JP) ............................... B25J/13/00 |
| 3-178789 | | 8/1991 | (JP) ................................. B25J/9/18 |

OTHER PUBLICATIONS

Brantmak et al., Man/machine communication in ASEA'S new robot controller, 1982, ASEA Jounal, vol. 55 No. 6, pp. 145–150.*

* cited by examiner

Primary Examiner—William A. Cuchlinski, Jr.
Assistant Examiner—McDieunel Marc
(74) Attorney, Agent, or Firm—Sughrue, Mion, Zinn, Macpeak & Seas, PLLC

(57) ABSTRACT

Parameters of a robot is displayed on a display device of an operation terminal in a manner that parameters having been changed and parameters having not been changed of all the parameters are displayed in a distinguished manner such that the background color of the parameters having been changed differs from that of other data.

7 Claims, 6 Drawing Sheets

FIG.3

| PARAMETER NAME | EXPLANATION |
|---|---|
| AIRERR1 | MECHANISM 1 AIR PRESSURE ERROR INPUT SIGNAL,MECHANISM 1 AIR PRESSURE ERROR OUTPUT SIGNAL |
| AIRERR2 | MECHANISM 2 AIR PRESSURE ERROR INPUT SIGNAL,MECHANISM 2 AIR PRESSURE ERROR OUTPUT SIGNAL |
| AIRERR1 | MECHANISM 3 AIR PRESSURE ERROR INPUT SIGNAL,MECHANISM 3 AIR PRESSURE ERROR OUTPUT SIGNAL |
| AIRERR1 | MECHANISM 4 AIR PRESSURE ERROR INPUT SIGNAL,MECHANISM 4 AIR PRESSURE ERROR OUTPUT SIGNAL |
| AIRERR1 | MECHANISM 5 AIR PRESSURE ERROR INPUT SIGNAL,MECHANISM 5 AIR PRESSURE ERROR OUTPUT SIGNAL |
| AREA1AT | AREA 1 CHECK KIND (NO/ZONE/INTERFERENCE= 0/1/2) |
| AREA1ME | AREA 1 CHECK MECHANISM No. |
| AREA1P1 | AREA 1 POSITION 1 (x,y,z,a,b,c,11,12) |
| AREA1P2 | AREA 1 POSITION 2 (x,y,z,a,b,c,11,12) |
| AREA2AT | AREA 2 CHECK KIND(NO/ZONE/INTERFERENCE= 0/1/2) |
| AREA2ME | AREA 2 CHECK MECHANISM No. |
| AREA2P1 | AREA 2 POSITION 1 (x,y,z,a,b,c,11,12) |
| AREA2P2 | AREA 2 POSITION 2 (x,y,z,a,b,c,11,12) |
| AREA3AT | AREA 3 CHECK KIND (NO/ZONE/INTERFERENCE= 0/1/2) |
| AREA3ME | AREA 3 CHECK MECHANISM No. |
| AREA3P1 | AREA 3 POSITION 1 (x,y,z,a,b,c,11,12) |
| AREA3P2 | AREA 3 POSITION 2 (x,y,z,a,b,c,11,12) |
| AREA4AT | AREA 4 CHECK KIND(NO/ZONE/INTERFERENCE = 0/1/2) |
| AREA4ME | AREA 4 CHECK MECHANISM No. |

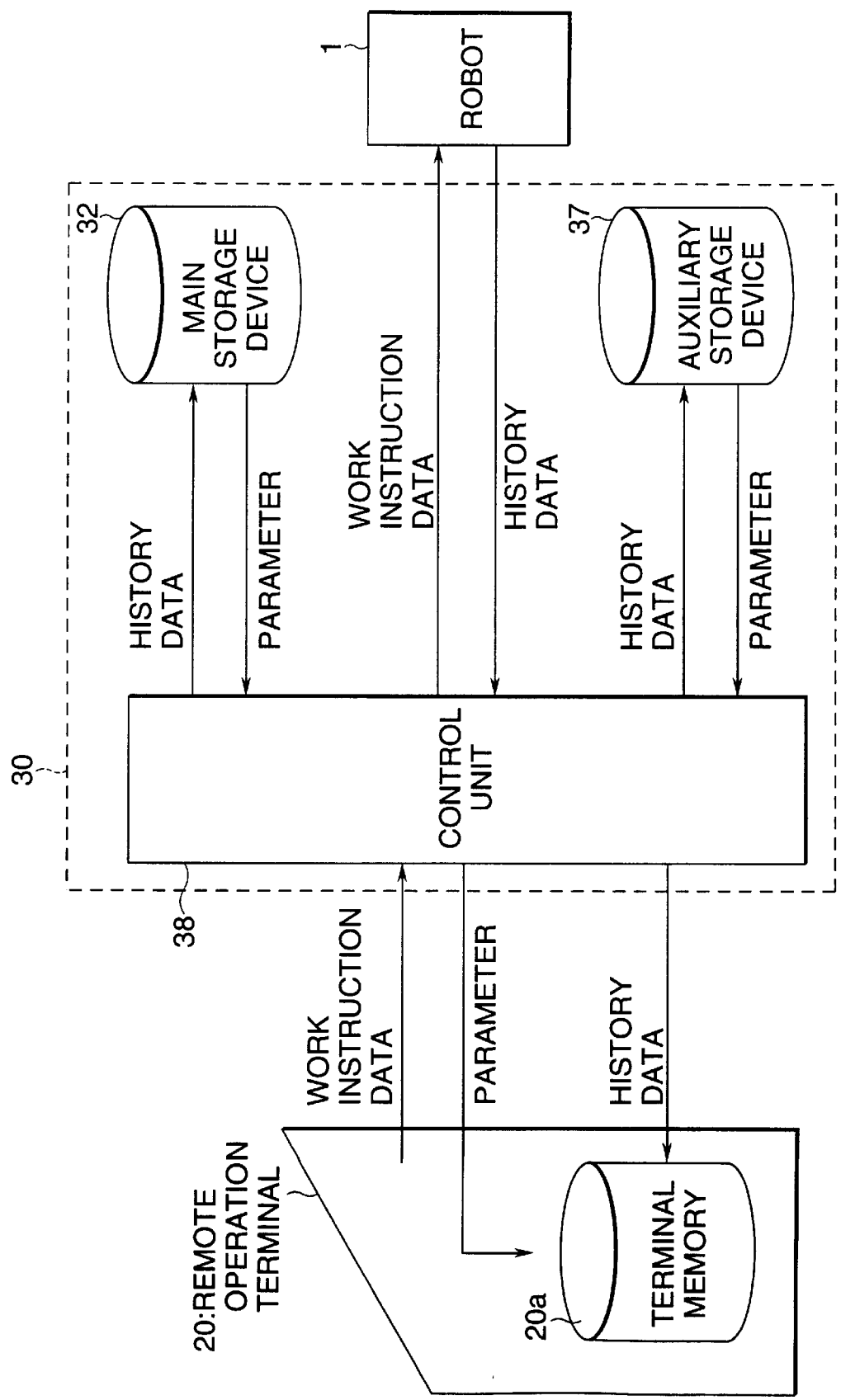

OPERATION TERMINAL AND REMOTE OPERATION SYSTEM FOR A ROBOT

BACKGROUND OF THE INVENTION

The present invention relates to an operation terminal and a remote operation system for a robot for facilitating the restoring operation of the robot.

Since a robot is configured as a system within an automatic production line by a user or a system manufacture after shipped from a factory, the setting condition (hereinafter called parameters) of the robot itself is surely optimized. These parameters of the robot operate in cooperation from one another. Thus, when a part of the parameters is modified or changed, an unexpected trouble may be caused. When a trouble is caused in the user side due to the parameter setting, the user determines the cause of the trouble while confirming the parameters of the robot and the parameters of a controller for the robot. In the case where the user can not determine or specify the cause, the user writes parameters relating to the contents of the trouble on a memo paper etc., then contacts with the robot manufacture or the service company of the robot by telephone, facsimile or the like and inquires about the cause of the trouble and the method of avoiding the trouble.

However, in recent years, the number of the parameters of a robot has been increased due to the progress of the technology of the robot. Thus, it has been difficult for a general user to accurately determine the parameter information relating to the trouble of a robot and contacts with the robot manufacture or the service company of the robot. Further, since a service staff of the robot manufacture or the service company can not directly look at the robot or the controller thereof (including the parameters thereof), it is difficult for the service staff to determine the cause of the trouble based on the information from the user.

Accordingly, much time is wasted in order to determine the cause of the trouble since it is required for the user and the service staff to contact to each other by telephone or facsimile for many times. Further, when the cause of the trouble can not be determined by the aforesaid method, since it is required to send the service staff to the user side, it takes further time for the staff to move to the user side. In particular, when the user locates at a remote place, there arises a problem that the production efficiency is degraded due to the stop of the robot for a long time and the service fee such as transportation expense becomes large.

FIG. 6 is a block diagram of a conventional robot control system shown in the Unexamined Japanese Patent Application Publication No. Hei 10-29181, for example, which proposes to eliminate the trouble of a robot without using means such as aforesaid telephone, facsimile or the like.

In the figure, a reference numeral 1 depicts a robot, 30 a controller for controlling the robot 1, and 20 a remote operation terminal for remotely operating the controller 30. The controller 30 includes a main storage device 32, an auxiliary storage device 37 and a control unit 38 for controlling the main storage device 32 and the auxiliary storage device 37.

The main storage device 32 stores parameter data, that is, various kinds of information for managing the controller 30. The auxiliary storage device 37 stores the parameter data as backup data. The control unit 38 receives work instruction data for instructing a work to be executed by the robot 1 from the remote operation terminal 20, then sends the work instruction data thus received to the robot 1, then receives history data representing the result of the work executed by the robot in accordance with the work instruction data, and sends the history data thus received to the remote operation terminal 20.

The remote operation terminal 20 collects the parameter data stored in the main storage device 32 and the auxiliary storage device 37 from these storage devices 32 and 37 periodically and stores in a terminal memory 20a of the remote operation terminal 20. That is, in this robot control system, the remote operation terminal 20 performs the backup processing in preparation for the case where the parameter data stored in the main storage device 32 and the auxiliary storage device 37 within the controller becomes failure.

Then, the operation of the robot control system will be explained.

First, when the remote operation terminal 20 sends the work instruction data to the controller 30, the work instruction data is sent to the robot 1 through the control unit 38. The robot 1 performs the work in accordance with the work instruction data, then generates the history data representing the result of the work executed by the robot 1 and sends the history data to the control unit 38.

At the time where the robot control system is initially introduced or a periodical term has lapsed after the initial introduction of the robot control system, the parameter data stored in the main storage device 32 is sent to the terminal memory 20a and stored therein. When the robot 1 generates the history data based on the work instruction data, the parameter of the main storage device 32 is updated and the parameter data of the auxiliary storage device 37 is updated. Further, the history data thus generated is sent to the terminal memory 20a and stored therein.

In the case where the trouble of the robot 1 is caused due to the failure of the main storage device 32 or the auxiliary storage device 37 or due to the erroneous setting of the parameters stored therein, the parameter data in the normal state stored in the terminal memory 20a of the remote operation terminal 20 is determined based on the history data, then the parameter data thus determined is sent to the main storage device 32 from the control unit 38 and stored therein, and the robot is restored.

Another restoring method is proposed in the Unexamined Japanese Patent Application Publication No. Hei 3-178789, wherein, in the case where the trouble of a robot is caused due to the parameter setting, the robot is restored by using voice of workers in the vicinity of the robot picked up by a microphone or using an image indicating the position or posture of the robot and the state of a control apparatus outputted from a television camera, thereby to eliminate the conventional method using telephone or facsimile etc.

In recent years, due to the progress of the technology of a robot, it has been difficult for a general user to accurately inform a service staff of parameter data according to the aforesaid failure diagnosis method using telephone or facsimile.

The trouble of a robot can be eliminated according to the aforesaid restoring method as disclosed in the Unexamined Japanese Patent Application Publication No. Hei 10-29181, wherein the history data and the parameters are stored in advance in the auxiliary storage device of the controller or the terminal memory of the remote operation terminal, and the parameter data is transferred to the main storage device of the controller at the time of occurrence of trouble thereby to intend to restore the controller. However, such a method becomes an obstacle at the time where a user changes the parameters of a robot so as to optimize the robot system.

Further, in the aforesaid method, since there is no means for displaying the parameter having been changed, it takes much time for a service staff to determine the parameter data and so it is difficult to obtain advice in a short time.

The aforesaid method of diagnosing the state of a robot by using voice or image as disclosed in the Unexamined Japanese Patent Application Publication No. Hei 3-178789 requires a dedicated device such as an expensive camera or monitor etc. Further, in such a method, even if a service staff can refer the parameters from the monitored image, it is difficult to determine the parameters having been changed, and so it is difficult to give advice to a user in a short time.

In the aforesaid method, even if the cause of the trouble due to the parameters is specified, a user can not execute the operation procedure for eliminating the trouble in a manner as suggested by a service staff. Thus, there is a case that further trouble is caused.

Furthermore, the conventional robot control system has a function of counting operation hours of joint parts of the robot itself and the number of operations thereof. However, the conventional robot control system has a problem that, in the case of instructing the opening/closing of robot hands and instructing a XY table driven in association with the robot, for example, a failure caused by such parts which are operated by operation instruction dedicated for a user prepared by the user in this manner can not be predicted.

SUMMARY OF THE INVENTION

The present invention has been made in order to obviate such conventional problems and an object of the present invention is to clearly show a changed portion of parameters to a service staff and a user at the time of occurrence of a trouble in a robot thereby to facilitate the determination of the content of the trouble by using the knowledge of the service staff. Alternatively, an object of the present invention is to facilitate the determination of the content of the trouble even for a user not familiar to the operation of the robot thereby to make it possible for the user to restore the robot in a short time. Further, another object of the present invention is to clearly display the instruction of a service staff to a user thereby to make it possible for the user to perform the restoring operation of the robot surely. Further, another object of the present invention is to provide a cheap system which does not require a dedicated device for the remote supporting.

The operation terminal according to the first aspect is arranged in a manner that a comparing means is provided for comparing the parameter data stored in the parameter memory means with previous parameter data having been stored in the past to detect a difference therebetween, and wherein the parameter data having been detected as being different from the previous parameter data by the comparing means is displayed on the parameter display means of the operation terminal in a distinguished manner from the parameter data having been detected as being same as the previous parameter data.

The operation terminal according to the second aspect is arranged in a manner that the operation terminal is formed by a personal computer, and each of the respective means of the operation terminal is formed by software and hardware of the personal computer.

A remote operation system for a robot according to the third aspect is arranged in a manner that a first operation terminal and a second operation terminal are connected to each other through a communication line and the second operation terminal is connected to a controller for the robot to be operated, wherein the first operation terminal includes a comparing means for comparing the parameter data stored in the controller for the robot with previous parameter data having been stored in the past to detect a difference therebetween, and wherein the parameter data having been detected as being different from the previous parameter data by the comparing means is displayed on the parameter display means of the first operation terminal in a distinguished manner from the parameter data having been detected as being same as the previous parameter data.

The remote operation system for a robot according to the fourth aspect is arranged in a manner that the operation terminals of the remote operation system are formed by personal computers, respectively, and each of the respective means of each of the operation terminals is formed by software and hardware of the personal computer.

The remote operation system for a robot according to the fifth aspect is arranged in a manner that each of the first and second operation terminals further comprises a switching means for temporarily changing an operation right for the robot operation means between the first and second operation terminals.

The operation terminal according to the sixth aspect is arranged in a manner that the number of operation instructions having been appeared relating to a user auxiliary instruction of the operation instructions for the robot is stored as parameter data, and the parameter data can be referred from the display device of the operation terminal.

The remote operation system for a robot according to the seventh aspect having the first and second operation terminals is arranged in a manner that the number of operation instructions having been appeared relating to a user auxiliary instruction of the operation instructions for the robot is stored as parameter data, and the parameter data can be referred from the display device of each of the operation terminals.

BRIEF DESCRIPTION OF THE DRAWINGS

FIG. 3 is a diagram showing a screen displayed on a display means in the first embodiment.

FIG. 6 is a diagram showing the arrangement of a conventional remote control system for a robot.

DETAILED DESCRIPTION OF THE PREFERRED EMBODIMENTS (First Embodiment)

Figure 1:
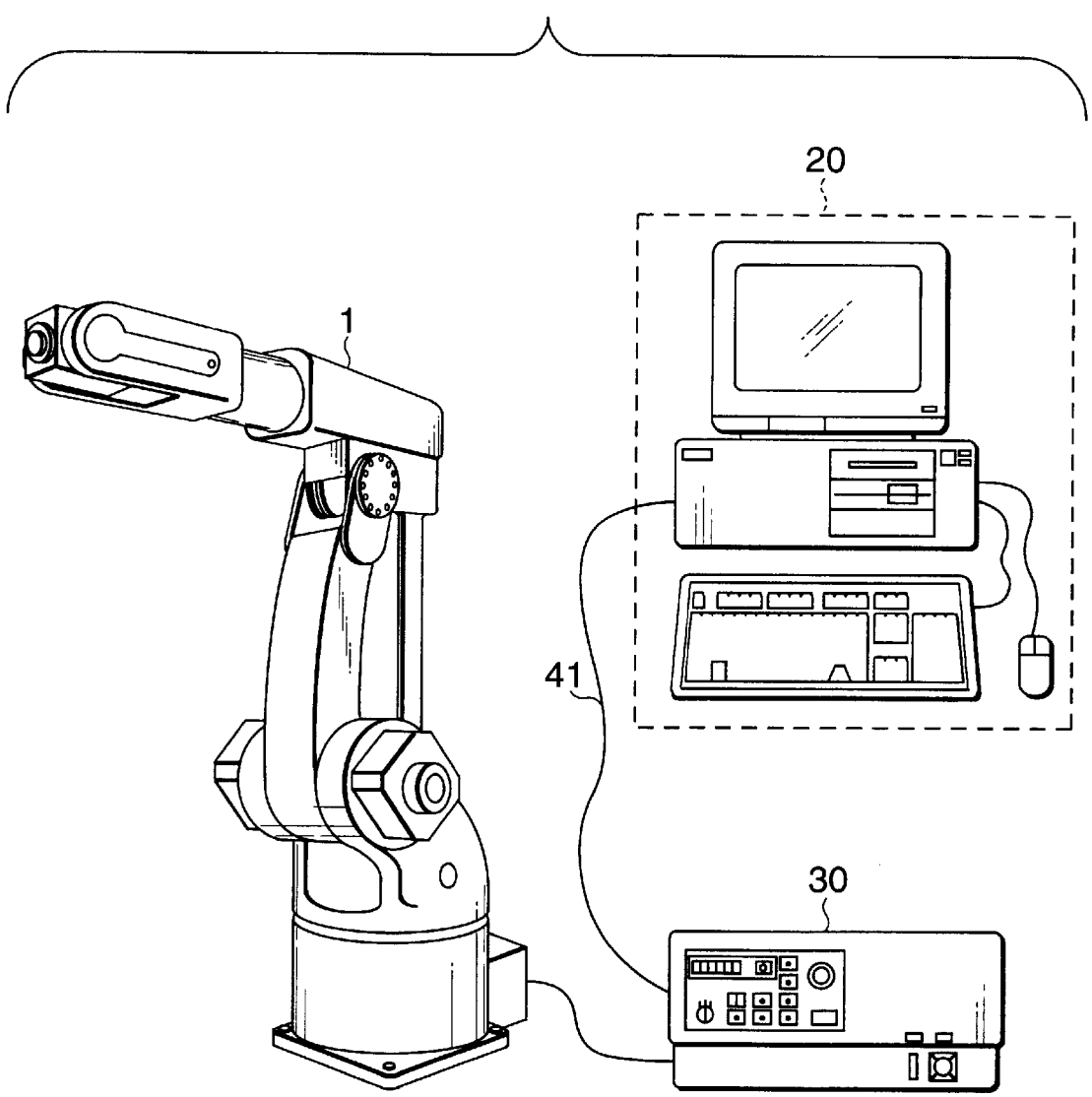
FIG. 1 is a diagram showing the arrangement of a remote control system for a robot according to the first embodiment of the present invention.
Figure 2:
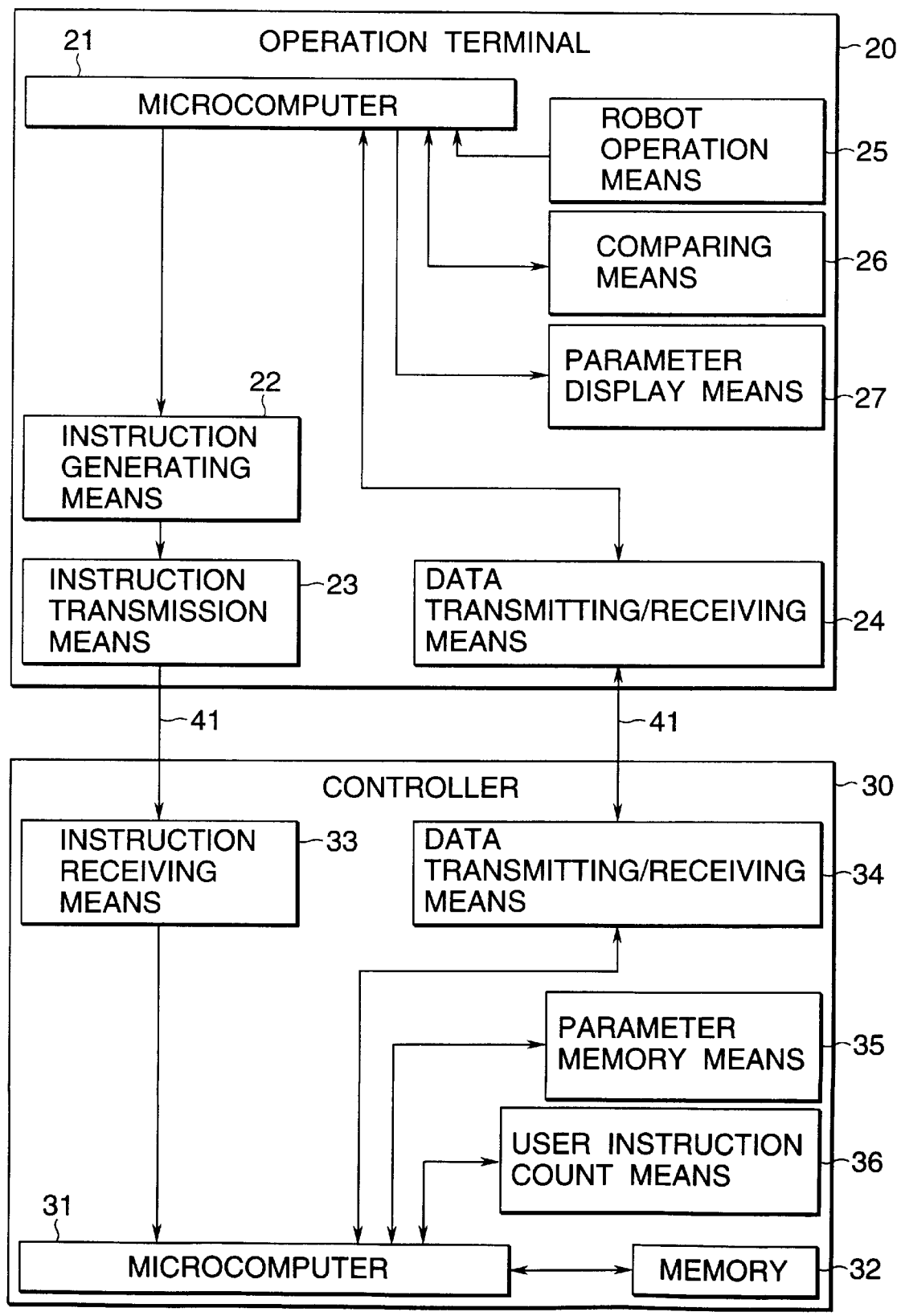
FIG. 2 is a block diagram showing the arrangement of the first embodiment.

FIG. 1 is a diagram showing the arrangement of a remote control system for a robot according to the first embodiment of the present invention, FIG. 2 is a block diagram thereof and FIG. 3 is a diagram showing a screen displayed on a display device of the operation terminal.

In the figure, a reference numeral 1 depicts a robot. A reference numeral 20 depicts an operation terminal used in the user side, which is coupled to the robot at the time of the occurrence of a trouble at the robot 1 so as to generate and input operation instructions for the robot 1 and to change parameter data for the robot. A reference numeral 30 depicts a controller for controlling the robot 1, which is coupled to the operation terminal 20 through a cable 41. The controller 30 is provided with an operation panel including operation buttons for supplying operation instructions to the robot 1.

A general personal computer (hereinafter referred to as a PC) is used as the operation terminal 20. The arrangement of the operation terminal will be explained below. A reference numeral 21 depicts a microcomputer (hereinafter referred to as a CPU) which controls respective means within the operation terminal 20 and processes various kinds of information between the operation terminal and the controller 30. A reference numeral 22 depicts an instruction generating means which generates operation instructions to the robot 1 and is formed by software dedicated for the operation terminal. A reference numeral 23 depicts an instruction transmission means which transmits the operation instructions to the controller 30 and is formed by a serial interface or a parallel interface of the PC. A reference numeral 24 depicts a data transmitting/receiving means which receives the various kinds of information from the controller 30 and transmits the various kinds of information thereto and is formed by a serial interface or the like of the PC. A reference numeral 25 depicts a robot operation means which inputs the control input for the operation terminal 20, inputs the operation instructions to the robot 1, and inputs and edits the parameter data. The robot operation means is formed by a key board, a mouse or the like for the PC. A reference numeral 26 depicts a comparing means which compares the current parameter data with the parameter data having been stored in the past to detect the result of the comparison, and is formed by software dedicated for the operation terminal. A reference numeral 27 depicts a parameter display means which displays the parameters based on the detected result of the comparison from the comparing means 26 and is formed by a cathode ray tube (CRT) of the PC. A reference numeral 270 depicts a parameter name column and 271 depicts a content explanation column of the parameters. A reference numeral 272 depicts a changed area showing the portion where the parameter data has been changed.

Then, the configuration of the controller 30 will be explained. A reference numeral 31 depicts a microcomputer (central processing unit: CPU) which controls the respective means within the controller 30, processes the operation instructions or operation control instructions from the instruction transmission means 23, performs data input/output processing between the data transmitting/receiving means 24 and the CPU, and controls the operation of the robot 1. A reference numeral 32 depicts a memory for storing program for the CPU 31. A reference numeral 33 depicts an instruction receiving means which receives the operation instructions from the operation terminal 20. A reference numeral 34 depicts a data transmitting/receiving means which transmits the parameter data of the controller 30 to the operation terminal 20 and receives the parameter data transmitted from the operation terminal 20. A reference numeral 35 depicts a parameter memory means which stores the parameter data for controlling the robot. A reference numeral 36 depicts a user instruction count means which counts and stores the number of appearance of user auxiliary instructions. The user auxiliary instructions is opening/closing instructions for robot hands, drive instructions for a XY table driven in association with the robot or the like, for example. Each of the parameter memory means 35 and the user instruction count means 36 may be replaced by the memory 32.

The explanation will be omitted as to an input/output device, such as a motor drive circuit for driving the robot 1, for the various kinds of the signals transmitted between the robot 1 and the controller 30.

The operation of the remote control system will be explained. When a trouble occurs in the robot 1 being operated, usually a user connects the controller 30 to the operation terminal 20 through the cable 41, and then operates the robot operation means 25 so that the robot operation means instructs the parameter display means 27 to display the parameters thereon. In this case, the comparing means 26 receives current parameter data stored in the parameter memory means 35 and the user instruction count means 36 and compares the current parameter data thus received with the previous parameter data stored in a floppy disc, a hard disc or the like, for example, to detect whether or not there is a difference between the current parameter data and the previous parameter data. The CPU 21 operates the parameter display means to display the current parameter data having been detected as being different from the previous parameter data by the comparing means 26 in a distinguished manner from the current parameter data having been detected as being same as the previous parameter data. That is, as shown in FIG. 3, the current parameter data having been detected as being different is displayed on the parameter display means 27 as the changed area 272 formed by the parameter name column 270 and the content explanation column 271 in a manner that the background color thereof differs from that of other data. The user selects one parameter within the parameter changed area 272 and operates the robot operation means 25 to change the displayed screen to a not-shown parameter data reference screen so as to refer to the current parameter data. Thereafter, the parameter data within the changed area is sequentially examined to solve the trouble.

In the case where the data of the parameter is erroneously set, the data can be changed in a manner that the formal or correct parameter data is inputted from the robot operation means 25 and stored into the parameter memory means 35 through the CPU 21, the data transmitting/receiving means 24, the data transmitting/receiving means 34 and the CPU 31. Thus, in the succeeding activation operation of the robot, the trouble caused by the parameter setting can be obviated.

The parameter data may be stored in the following manners, for example, other than the aforesaid manner.

(1) Only the changed parameter data is stored in a part of the parameter memory means 35, and the operation terminal receives only the changed information as the parameter data and displays on the parameter display means 27.

(2) At the time of shipping the robot, both the parameter data being stored temporarily and the parameter data being used at the present time is stored in the parameter memory means 35, then these parameter data is compared to each other by the comparing means 26 and displayed on the parameter display means 27 in a distinguished manner.

As a method for displaying in the distinguished manner, the following method maybe used other than the aforesaid method of changing the background color;

(1) color of characters is changed,
   (2) tone of characters is changed,
   (3) characters are written by bold lines or underlined,
   (4) characters are written in different size
   (5) symbols or marks are added, and
   (6) any ones of aforesaid methods are combined.
   (Second Embodiment)

Figure 4:
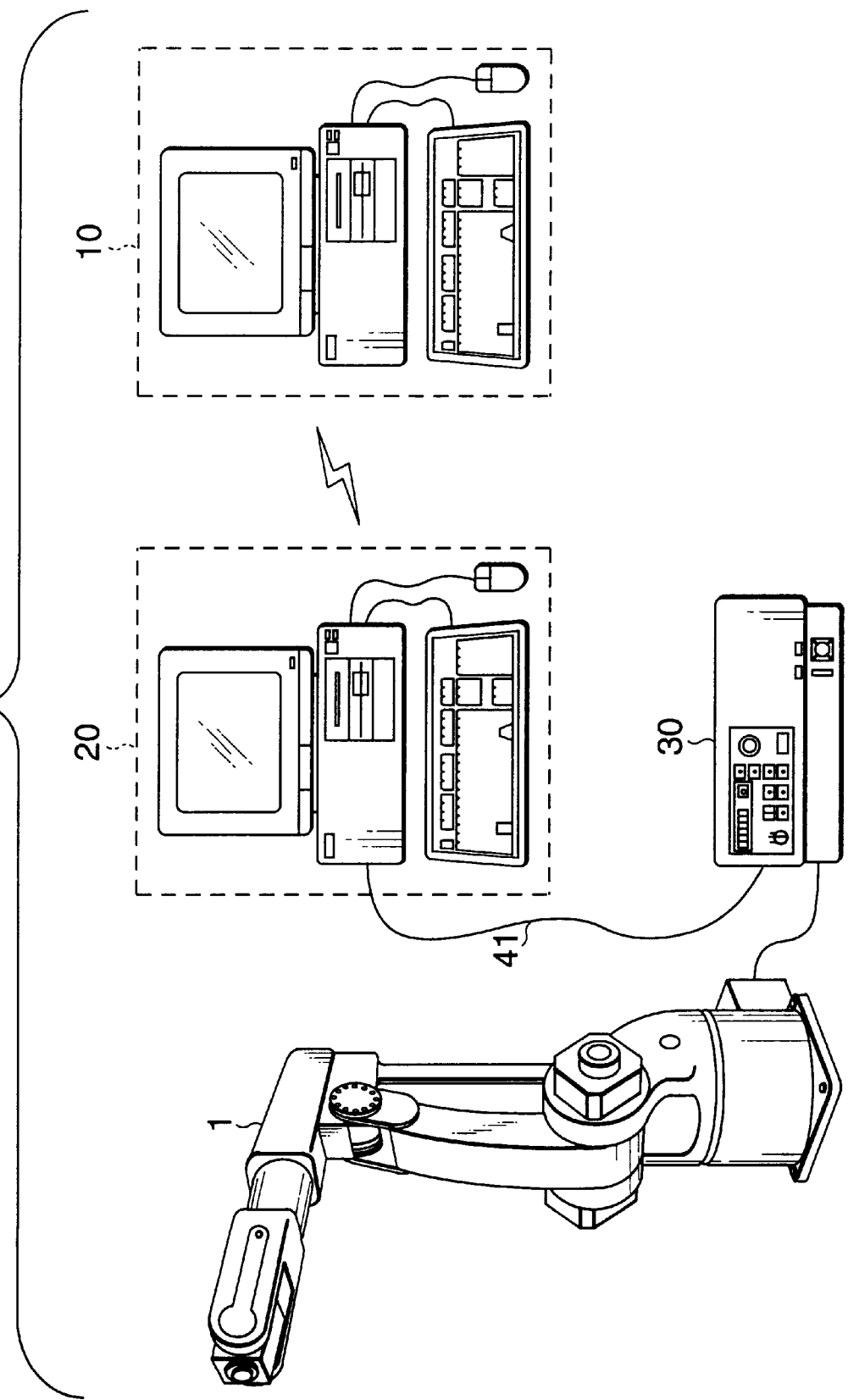
FIG. 4 is a diagram showing the arrangement of a remote control system for a robot according to the second embodiment of the present invention.
Figure 5:
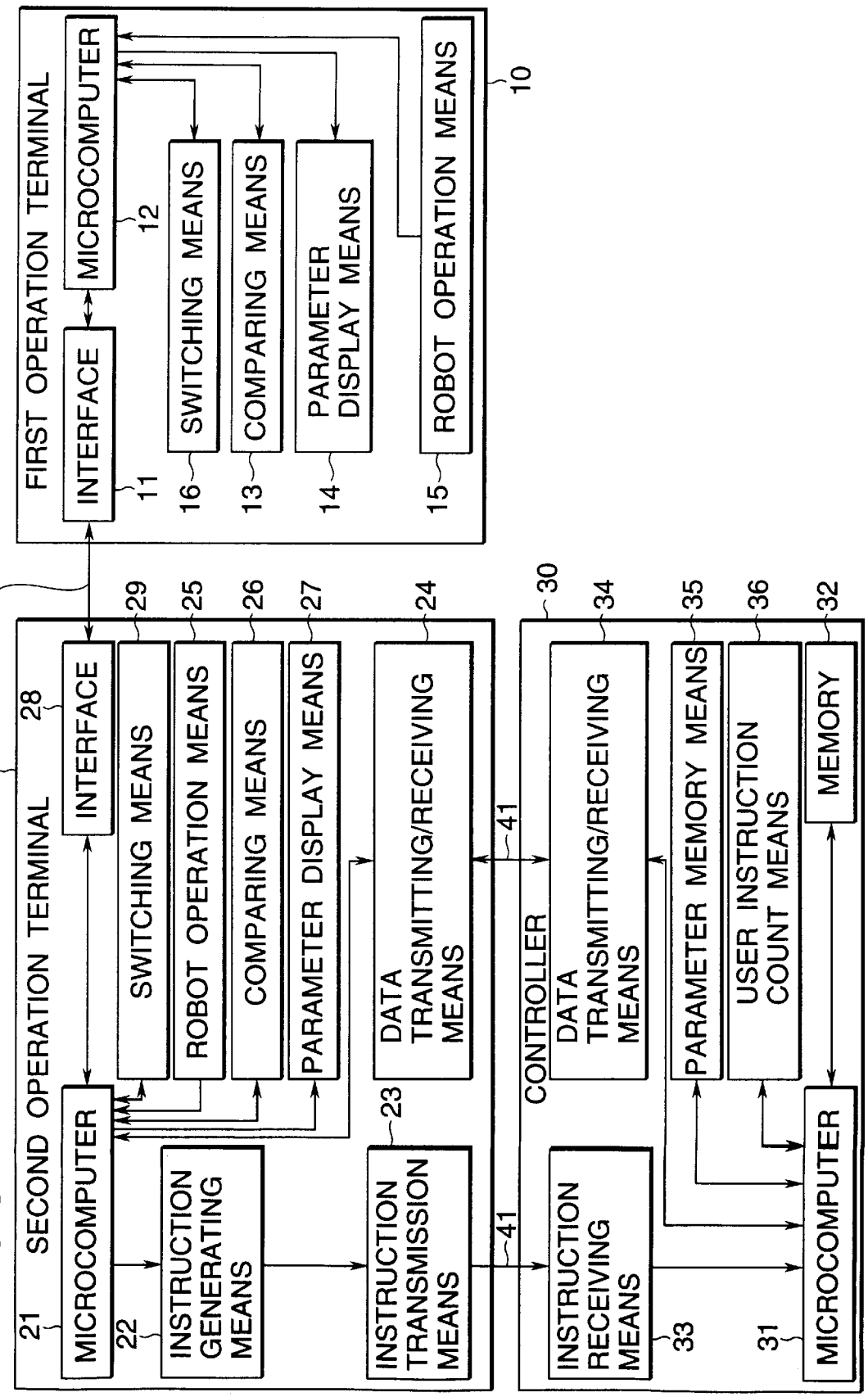
FIG. 5 is a block diagram showing the arrangement of the second embodiment.

FIG. 4 is a diagram showing the arrangement of a remote control system for a robot according to the second embodiment of the present invention and FIG. 5 is a block diagram thereof.

In the figure, a reference numeral 1 depicts a robot, 10 a first operation terminal which is normally disposed on a service staff side, and 20 a second operation terminal which is used on a user side and coupled to the first operation terminal 10 through a communication line 40 such as a telephone line, a network or the like. A reference numeral 30 depicts a controller for controlling the robot 1 to be remotely operated, which is coupled to the second operation terminal 20 through a cable 41.

A general personal computer is used for the first operation terminal 10. The arrangement of the first operation terminal will be explained below. A reference numeral 11 depicts an interface for inputting various kinds of information from the second operation terminal 20 and outputting the various kinds of information thereto. A serial interface of a PC is used as the interface. A not-shown modem is connected to the interface to constitute the communication line 40. A reference numeral 12 depicts a microcomputer (hereinafter referred to as a CPU) which controls respective means within the operation terminal 10 and processes various kinds of information from the interface 11. A reference numeral 13 depicts a comparing means for comparing parameters, which is formed by software dedicated for the terminal of the PC. A reference numeral 14 depicts a parameter display means which displays the parameter data based on the detected result of the comparison from the comparing means 13 and is formed by a CRT connected to the PC. A reference numeral 15 depicts a robot operation means which inputs operation instructions to the robot 1, and inputs and edits the parameter data. The robot operation means is formed by a key board, a mouse or the like for the PC. A reference numeral 16 depicts a switching means for changing over an operation right between the first operation terminal 10 and the second operation terminal 20, which corresponds to a flag managed by the software dedicated for the terminal.

A general personal computer is also used for the second operation terminal 20. The arrangement of the second operation terminal will be explained below. A reference numeral 21 depicts a CPU which controls respective means within the second operation terminal 20 and processes various kinds of information between the first operation terminal 10 and the controller 30. A reference numeral 22 depicts an instruction generating means which generates operation instructions to the robot 1, and 23 depicts an instruction transmission means which transmits the operation instructions to the controller 30. A reference numeral 24 depicts a data transmitting/receiving means which receives the various kinds of data from the controller 30 and transmits the various kinds of data thereto and is formed by a serial interface of the PC. A reference numeral 25 depicts a robot operation means which inputs the control input for the second operation terminal 20, inputs the operation instructions to the robot 1 and changes the parameter data. The robot operation means is formed by a key board, a mouse or the like for the PC. A reference numeral 26 depicts a comparing means which compares the current parameter data with the parameter data having been stored in the past to detect the result of the comparison. A reference numeral 27 depicts a parameter display means which displays the parameters based on the detected result of the comparison from the comparing means 26. A reference numeral 28 depicts an interface for inputting various kinds of information from the first operation -terminal 10 and outputting the various kinds of information thereto. A reference numeral 29 depicts a switching means for changing over an operation right between the first operation terminal 10 and the second operation terminal 20. The priority of the operation right is set by the software dedicated for the terminal in the order of the first operation terminal 10 and the second operation terminal 20.

The arrangement of the controller 30 is same as that of the first embodiment, and so the explanation thereof will be omitted.

The operation of the remote control system of this embodiment will be explained. When a trouble occurs in the robot 1 being operated, usually a user connects the controller 30 to the second operation terminal 20 through the cable 41, and then operates the robot operation means 25 so that the robot operation means instructs the parameter display means 27 to display the parameter data thereon. Then, the comparing means 26 receives current parameter data stored in the parameter memory means 35 and the user instruction count means 36 and compares the current parameter data thus received with the previous parameter data stored in a floppy disc, a hard disc or the like, for example, to detect whether or not there is a difference between the current parameter data and the previous parameter data. The CPU 21 operates the parameter display means 27 to display the current parameter data having been detected as being different from the previous parameter data by the comparing means in a distinguished manner from the current parameter data having been detected as being same as the previous parameter data. Thereafter, the user examines the parameter data within the changed area to solve the trouble.

In the case where the user can not determine the cause of the trouble, the user contacts with a service staff of a robot manufacture or a service company of the robot by telephone. The service staff having been contacted instructs the user to connect the communication line 40 to the interface 28 of the second operation terminal 20 of the user side, and the service staff connects the communication line 40 to the interface 11 of the first operation terminal 10 of the service staff side. Thereafter, the line is connected from the first operation terminal 10 to the second operation terminal 20.

Then, the service staff operates the robot operation means 15 so that the instruction for displaying the parameters on the parameter display means 14 of the first operation terminal 10 is supplied thereto from the robot operation means. Thereafter, like the aforesaid method in the second operation terminal 20, the comparing means 13 receives current parameter data stored in the parameter memory means 35 and the user instruction count means 36 and compares the current parameter data thus received with the previous parameter data stored in the not-shown floppy disc, hard disc or the like, for example, to detect whether or not there is a difference between the current parameter data and the previous parameter data. Like the first embodiment, the CPU 11 operates the parameter display means 14 to display the parameters in the distinguished manner as shown in FIG. 3.

In the case where the data of the parameter is erroneously set, the data can be changed in the following manner. That is, the service staff firstly operates the robot operation means 15 to input an instruction for changing the operation right from the second operation terminal 20 to the first operation terminal 10. Thus, the priority information corresponding to the instruction thus inputted is set in the switching means 16 and the switching means 29 on the second operation terminal 20 side. Hereinafter, it becomes impossible to change the parameter data from the second operation terminal 20 side. Then, the service staff inputs the formal or correct parameter data from the robot operation means 15 thereby to store the formal parameter data into the parameter memory means 35 through the CPU 12, the interface 11, the communication line 40, the interface 28, the CPU 21, the instruction generating means 22, the instruction transmission means 23, the cable 41, the instruction receiving means 33 and the CPU 31. Thus, in the succeeding activation operation of the robot, the trouble caused by the parameter setting can be obviated.

A number of the second operation terminal is not limited to one, but may be not less than one.

Since the present invention is arranged in the aforesaid manner, the present invention has the following effects.

According to the first aspect, the parameter data having been detected as being different from the previous parameter data is displayed in a distinguished manner from the parameter data having been detected as being same as the previous parameter data, and the parameter data can be referred from the operation terminal. Accordingly, in the case where a trouble depending on the parameter setting occurs, it becomes possible to reduce time required for examining or determining the cause of the trouble and hence to reduce time required for restoring the robot.

According to the second aspect, since the respective means of the operation terminal is formed by the personal computer, the restoring operation of the robot can be realized merely by installing software without purchasing a dedicated device.

According to the third aspect, it is possible to refer both the parameter data having been changed and the parameter data having not been changed in a distinguished manner through the communication line even from a remote place. Thus, in the case where a trouble depending on the parameter setting occurs, the cause of the trouble can be determined without causing the confusion of the analysis of the trouble due to the shortage of the information or erroneous communication by telephone etc. Accordingly, it becomes possible to reduce time required for examining or determining the cause of the trouble and to reduce time required for restoring the robot.

According to the fourth aspect, since the respective means of each of the operation terminals of the remote operation system is formed by the personal computer, the remote operation system can be configured at a low cost merely by installing software without purchasing a dedicated device.

According to the fifth aspect, since the operation right can be switched between the operation terminal on the user side and the operation terminal on the service staff side, it is possible to prevent the occurrence of the secondary trouble due to the simultaneous operations of the operation terminals on the user side and the service staff side, and so it is possible to restore the robot smoothly.

According to the sixth and seventh aspect, the number of operation instructions relating to a user auxiliary instruction of the operation instructions for the robot is stored as the parameter data, and the parameter data can be referred from the operation terminal. Thus, it is possible to easily examine the cause of a trouble due to the user's operation relating to the life time of the device such as the opening/closing operation of the robot hands.

What is claimed is:

1. An operation terminal for an industrial robot connected in use to a robot controller having parameter memory means, comprising:
   robot operation means for inputting and editing parameter data stored in said parameter memory means and supplying an operation instruction to said robot;
   comparing means for comparing the parameter data stored in said parameter memory means with previous parameter data having been stored in the past to detect a difference therebetween;
   data transmitting/receiving means for transmitting the parameter data to said robot controller and receiving the parameter data from said robot controller;
   parameter display means for displaying the parameter data; and
   microcomputer for controlling said robot operation means, said comparing means, said data transmitting/receiving means and said parameter display means, wherein
   the parameter data having been detected as being different from the previous parameter data by said comparing means is displayed on said parameter display means in a distinguished manner from the parameter data having been detected as being same as the previous parameter data.

2. The operation terminal for an industrial robot according to claim 1, wherein
   said operation terminal is formed by a personal computer.

3. The operation terminal for a robot according to claim 1, wherein
   said robot controller includes user instruction count means for counting and storing therein a number of operation instructions relating to a user auxiliary instruction of the operation instructions for said robot as a parameter, and wherein
   the parameter data can be referred from said operation terminal.

4. A remote operation system for a robot wherein a first operation terminal and a second operation terminal are connected to each other through a communication line and said second operation terminal is connected to a robot controller having a parameter memory mean s in use, wherein
   said first operation terminal comprising:
      an interface connected to said second operation terminal through the communication line to transmit and receive data to and from said second operation terminal;
      robot operation means for inputting and editing parameter data stored in said parameter memory means and supplying an operation instruction to said robot;
      comparing means for comparing the parameter data stored in said parameter memory means with previous parameter data having been stored in the past to detect a difference therebetween;
      parameter display means for displaying the parameter data; and
      a microcomputer for controlling said interface, said robot operation means, said comparing means and said parameter display means, wherein
   said second operation terminal comprising:
      an interface connected to said first operation terminal through the communication line to transmit and receive data to and from said first operation terminal;
      robot operation means for inputting and editing parameter data stored in said parameter memory means and supplying an operation instruction to said robot; and
      data transmitting/receiving means for transmitting the parameter data to said robot controller and receiving the parameter data from said robot controller, wherein
   said robot controller comprising:
      data transmitting/receiving means for transmitting and receiving the parameter data of said parameter memory means to and from said second operation terminal; and
      a microcomputer for controlling said parameter memory means and said data transmitting/receiving means, wherein the parameter data having been detected as being different from the previous parameter data by said comparing means is displayed on said parameter display means in a distinguished manner from the parameter data having been detected as being same as the previous parameter data.

5. The remote operation system for a robot according to claim 4, wherein said first and second operation terminals are formed by personal computers, respectively.

6. The remote operation system for a robot according to claim 4, wherein each of said first and second operation terminals further comprises:

a switching means for providing one of said first and second operation terminals with an operation right for said robot operation means in preference to the other of said first and second operation terminals.

7. The remote operation system for a robot according to claim 4, wherein said robot controller further comprises user instruction count means for counting and storing therein a number of operation instructions relating to a user auxiliary instruction of the operation instructions for said robot as a parameter, and wherein the parameter data can be referred from said operation terminal.

* * * * *